July 26, 1960  J. W. HARRIS  2,946,308
DEVICE FOR PROVIDING WATER AND LIQUID FOOD TO ANIMALS
Filed Feb. 19, 1958  2 Sheets-Sheet 1

INVENTOR.
JESS W. HARRIS
BY Joseph G. Werner
ATTORNEY

July 26, 1960   J. W. HARRIS   2,946,308
DEVICE FOR PROVIDING WATER AND LIQUID FOOD TO ANIMALS
Filed Feb. 19, 1958   2 Sheets-Sheet 2
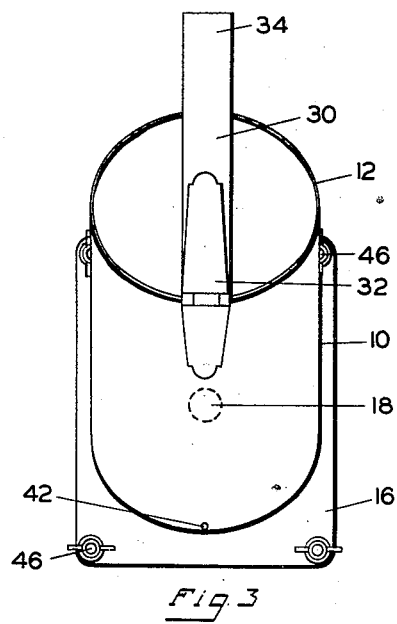
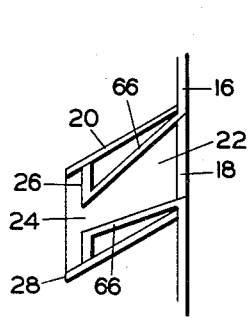
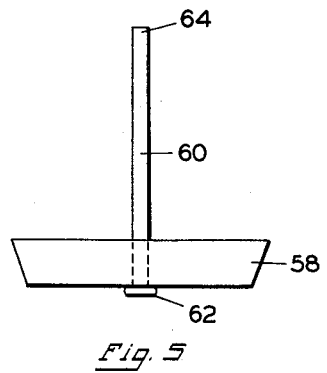
INVENTOR.
JESS W. HARRIS
BY *Joseph G. Werner*
ATTORNEY

United States Patent Office 2,946,308
Patented July 26, 1960

2,946,308

DEVICE FOR PROVIDING WATER AND LIQUID FOOD TO ANIMALS

Jess W. Harris, Madison, Wis.
(Rte. 1, Cottage Grove, Wis.)

Filed Feb. 19, 1958, Ser. No. 716,197

14 Claims. (Cl. 119—18)

This invention relates to a device for providing water and liquid food to animals, particularly to captive animals.

The devices commonly in use for providing water and liquid food to caged animals in laboratories, zoos and the like have an open cup inside the cage which is easily contaminated with foreign matter and bacteria. Such devices require frequent cleaning and new supplies of water or food. Many of the devices now in use are subject to being broken, damaged, tampered with and put out of order by animals such as monkeys, rats and so forth. Moreover, under present practices it is often necessary to feed or give water to young animals with a bottle and nipple, a spoon or similar manner.

Some attempts have been made to produce so-called "self-feeding" and "self-watering" devices in which the food and water are not as readily contaminated. However, such devices are generally complicated mechanisms which are relatively expensive to make, and which are easily put out of order.

It is an object of the present invention to provide a device for providing water and liquid food which is sanitary and is not easily contaminated with bacteria or foreign matter.

It is another object of this invention to provide a device as set forth which is not easily broken, damaged, or put out of order by animals.

An additional object of this invention is to provide a device as described which functions as a self-feeder for smaller animals, thereby largely eliminating the need for bottle- or spoon-feeding of such animals.

A further object of the invention is to provide a device as described which is simple and inexpensive to manufacture and maintain.

A still further object of this invention is to provide a device as described which can easily be attached to animal cages, and readily filled with water or liquid food.

Another object of this invention is to provide a device as described which avoids waste of water and maintains the cage in a relatively dry, clean condition.

These and other objects and advantages of the invention will be apparent from the following description and the accompanying drawings, wherein:

Fig. 3 is a rear elevational view of the device.

Fig. 4 is an enlarged sectional view of the tube guard section taken along line 4—4 of Fig. 1.

Fig. 5 is a plan view of the stopper and tubing used in the device.

Figure 1:
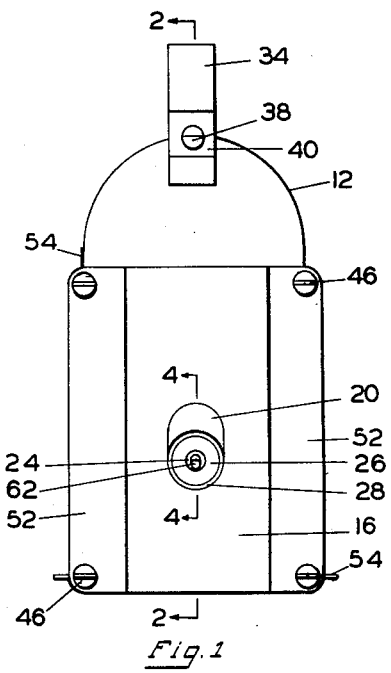
Fig. 1 is a front elevational view of the device.

Bottle-holder 10 has a cylindrical sidewall 12 of a size which will hold a conventional cylindrically shaped bottle 14. The forward end of bottle-holder 10 is a plate 16 having aperture 18. Extending forward from hole 18 is tube guard 20 which is preferably cylindrically-shaped. Within the tube guard 20 and in communication with aperture 18 is a pasageway 22 in elliptical conic section. The opposite end 24 of passageway 22 passes through wall 26 which is contained within tube guard 20, and terminates just short of the opposed end 28 of tube guard 20.

Figure 2:
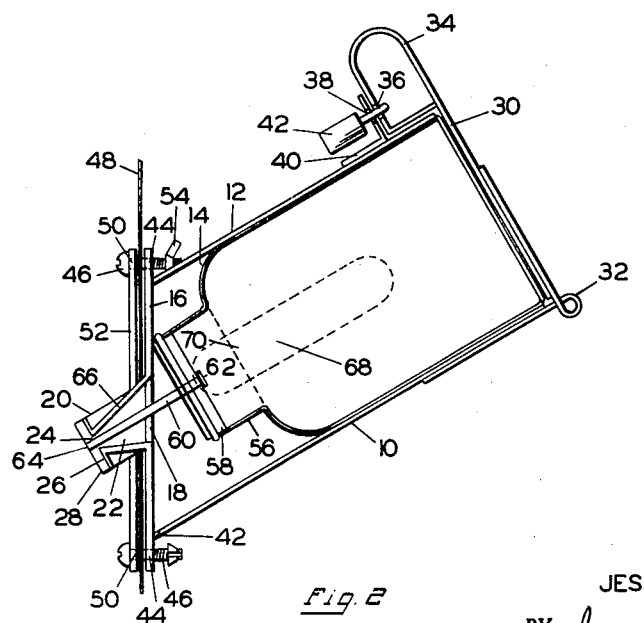
Fig. 2 is a sectional view of the device taken along line 2—2 of Fig. 1, additionally showing attachment to an animal cage and a padlock on the bottle-holder.

The rear end of bottle-holder 10 carries a strap 30 of metal or other suitable material which is attached to hinge 32. The upper portion 34 of strap 30 may be looped as shown in Fig. 2. By placing a hole 36 in the looped portion 34 of strap 30 in matching relation with hole 38 of angle iron or L-shaped iron 40 which is secured to sidewall 12, padlock 42 may be used to retain loop portion 34 and angle iron 40 in locked position.

Sidewall 12 has a small drainage hole 42 near the junction between the sidewall and the lower side of plate 16. Bolts 46 extend through holes 50 in backing plates 52, and through caging 48 and matching holes 44, in plate 16. Bottle-holder 10 is thus secured in position on cage wire 48 by tightening wingnuts 54 or the like on bolts 46. When my device is used with highly intelligent animals such as monkeys it is desirable to have the wingnuts 54 on the outside of the cage, as shown, so that they are less subject to being loosened by the animal.

Bottle 14, which may have a neck 56, with a stopper 58 and a tube 60, preferably copper, slides within sidewall 12. Tube 60 has a flanged end 62 which prevents the animal from pulling the tube through stopper 58. When the bottle 14 is inserted into bottle-holder 10, the end 64 of tube 60 is easily guided through hole 24 of passageway 22 by the guide-wall 66 in tube guard 20. Tube end 64 extends outwardly preferably flush with end 28 of tube guard 20, but may extend slightly beyond or just short of end 28.

Sidewall 12 may have an open finger slot 68 which facilitates removal of the bottle 14 from bottle-holder 10, when the strap 30 is in unlocked position. The operator may push against the shoulder 70 of the bottle to push it out through the rear end of bottle-holder 10. The open finger slot also provides an opening in sidewall 12 to permit a person to observe the level of the liquid in bottle 14.

In operation the bottle-holder 10 is secured to the cage as hereinabove described. Bottle 14 is filled with water or liquid food, as may be desired, and stopper 58 containing tube 60 is placed in the opening of the bottle. The bottle 14 is inverted and placed inside the bottle-holder 10 from the rear end thereof so that the tube 60 is guided through hole 24 as shown in Fig. 2. Strap 30 may then be swung up on hinge 32 against the rear end of the bottle-holder and may be locked in closed position with lock 42 in order to prevent the animals from pushing the bottle from the bottle-holder.

When the bottle is so inverted the water or liquid food does not run from the tube 60 until the animal places its tongue or lips to the tube 64. The diameter of the tube 60 is of relatively small size as to provide considerable surface tension of the liquid at the tube end 64, which restrains the liquid at the end of the tube from flowing until the animal contacts it. Moreover, the relative size and location of the tube in the bottle retards replacement of air in the bottle as the liquid is removed from the bottle, thereby preventing ready flow of the liquid when not in contact with the animal. Although various sized and shaped bottles may be used with varying sized tubes, it has been found that for a bottle of 250 cc. a tube 60 having an outside diameter of ¼ inch and an inside diameter of $\frac{3}{16}$ inch works very satisfactorily. The tube is preferably of copper to prevent corrosion and breakage. As stated, the tube 60 preferably extends outward from wall 26 only a short distance so that it may not be gnawed, bent or broken by the animal. Since the upper portion of stopper 58 rests against plate 16 the animal cannot pull the stopper from the bottle if it pulls on tube 60.

When the animal drinks from the tube by applying its tongue or lips to the end of it the liquid flows in adequate supply, but slowly enough to permit small animals to drink, without use of a nipple or spoon. When the animal stops drinking from the end of the tube, the flow of water from the bottle also stops. The bottle 14 is easily removed from the bottle-holder 10 by removal of lock 42 and pulling strap 30 back and downward on hinge 32. The shoulder 70 of the bottle 14 may be pushed backward with the fingers through slots 68 until the rear of the bottle may be grasped by the hand and completely removed from the bottle-holder. The stopper 58 may be removed and the bottle refilled with liquid. The stopper may then be replaced and the bottle returned to the bottle-holder to renew the operation.

Although a preferred embodiment of the present invention has been illustrated and described, it will be understood that various changes and modifications may be made in the details thereof without departing from the spirit and scope of the invention as set forth in the following claims.

I claim:

1. A device for holding a liquid container with a forwardly extended tube for watering and liquid feeding animals within a cage comprising, a side wall, a forward plate, said forward plate carrying a guard for said tube, a forwardly extending end of said guard being in radial relation to the end of the tube, means secured to said forward plate for attaching said plate to the cage.

2. A device for holding a liquid container with a forwardly extended tube for watering and liquid-feeding of animals within a cage comprising, a side wall, a forward plate, said forward plate carrying a guard for said tube, a forwardly extending end of said guard being in radial relation to the end of the tube, guide means for said tube within said guard, means secured to said forward plate for attaching said plate to the cage.

3. A device for holding a liquid container having a stopper and tube for watering and liquid-feeding of animals within a cage comprising, a side wall, a forward plate, said forward plate carrying a guard for said tube, a forwardly extending end of said guard being in radial relation to the end of the tube, guide means for said tube within said guard, means for locking said container within said device, and means secured to said forward plate for attaching said device to the cage.

4. A device for holding a liquid container with a forwardly extended tube for watering and liquid-feeding of animals within a cage comprising, a side wall having slot means, a forward plate, a guard for said tube extending from said plate, a forwardly extending end of said guard being in radial relation to the end of the tube, guide means for said tube within said guard, means secured to said forward plate for attaching said plate to the cage.

5. A device for holding a cylindrically-shaped liquid extended tube for watering and liquid-feeding animals comprising, a cylindrically-shaped sidewall, a forward plate, a guard for said tube extending forwardly from said plate, a forwardly extending end of said guard being in radial relation to the end of the tube, rearward means for locking said container within said device, means secured to said forward plate for retaining said device in stationary position.

6. A liquid feeding and watering device for animals comprising, a liquid container with a forwardly extending tube, a holder for said container having a side wall in engagement with said container and a forward plate, guard means for said tube extending forwardly from said plate.

7. A liquid feeding and watering device for animals comprising, a liquid container with a stopper and a forwardly extending tube, a holder for said container having a side wall in engagement with said container and a forward plate, guard means for said tube extending forwardly from said plate, a rearward plate for locking said container within said holder.

8. A liquid feeding and watering device for animals within a cage comprising, a liquid container with a stopper and a forwardly extending tube, a holder for said container having a side wall in engagement with said container and a forward plate, guard means for said tube extending forwardly from said plate, means within said guard for guiding said tube into said guard means, means secured to said forward plate for attaching said plate to the cage.

9. In a device for feeding liquids to animals the combination of an inverted liquid container having liquid therein, a stopper at the mouth of said container, an open tube extending through said stopper and outwardly beyond said stopper, a holder for said container having a side wall in engagement with said container and a front plate having an aperture through which to extend said tube, guard means for said tube extending forwardly from said front plate, said guard means being in communication with said aperture.

10. In a device for feeding liquids to caged animals the combination of an inverted food container having liquid therein, a stopper at the mouth of said container, an open tube extending through said stopper and outwardly beyond said stopper, a holder for said container having a side wall in engagement with said container and a front plate having an aperture through which is extended the outward end of said tube, guard means for said tube extending forwardly from said front plate in communication with said aperture, guide means within said guard means for extending said tube into said guard means, a cage wall, means attached to said front plate for securing said container to said cage wall.

11. In a device for feeding liquids to caged animals the combination of an inverted cylindrical food container having liquid therein, a stopper at the mouth of said container, an open tube extending through said stopper and outwardly beyond said stopper, a holder for said container having a cylindrical sidewall and a front plate provided with an aperture, the outer end portion of said tube extending through said aperture, guard means for said tube extending forwardly from said front plate in communication with said aperture, guide means within said guard means for extending said tube into said guard means, means secured to said holder for locking said container within said holder, a cage wall, means attached to said front plate for securing said container to the said cage wall.

12. A device for holding a liquid container with a forwardly extended tube for watering and liquid feeding animals within a cage comprising, a forward plate with an aperture through which to extend said tube, said forward plate carrying a guard for said tube, said guard comprising a housing with an apertured front wall through which to extend said tube and a forward end extending beyond said front wall in radial relation to the end of the tube, means secured to said forward plate to hold said container in stationary position, means secured to said forward plate for attaching said plate to the cage.

13. A liquid feeding and watering device for animals within a cage comprising, a liquid container with a forwardly extending tube, a plate forward of and in contact with the container, said plate having an aperture through which to extend the tube, said plate carrying forwardly extending guard means for said tube, means secured to said forward plate to hold said liquid container in stationary position, means secured to said forward plate for attaching said plate to the cage.

14. In a device for feeding liquids to caged animals the combination of an inverted food container having liquid therein, a stopper at the mouth of said container, an open tube extending through said stopper and outwardly beyond said stopper, a holder for said container having a front plate and means secured to said front plate to hold said container in stationary position, said front plate having an aperture through which is extended the outward end of said tube, guard means for said tube extending forwardly from said front plate in communication with said aperture, a cage wall, means attached to said front plate for securing said container to said cage wall.

References Cited in the file of this patent

UNITED STATES PATENTS

| | | |
|---|---|---|
| 2,311,207 | Bussey | Feb. 16, 1943 |
| 2,467,525 | Fricke | Apr. 19, 1949 |
| 2,653,569 | Forester | Sept. 29, 1953 |